April 15, 1969 G. E. TOLLEY 3,438,648
VEHICLE STABILIZER
Filed Oct. 16, 1967 Sheet 1 of 2
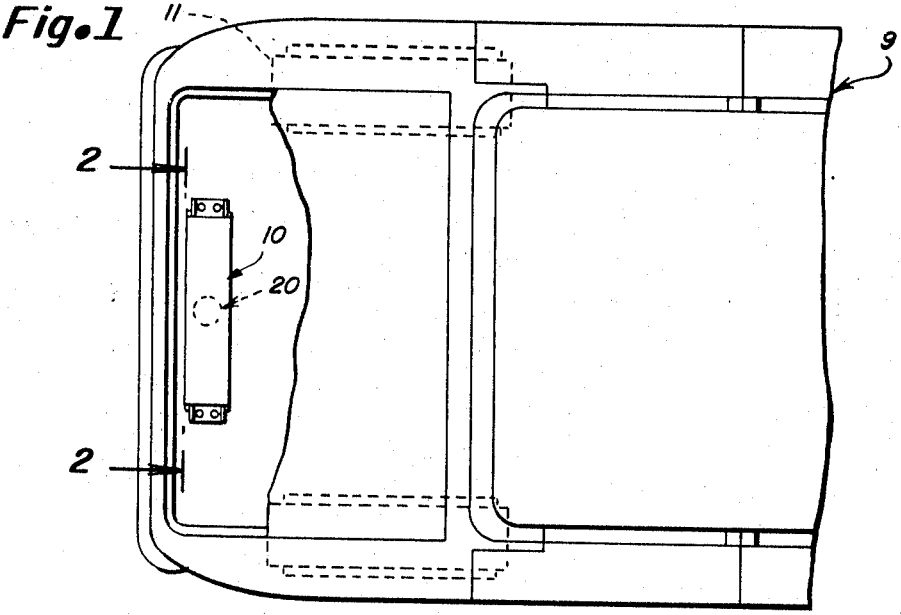
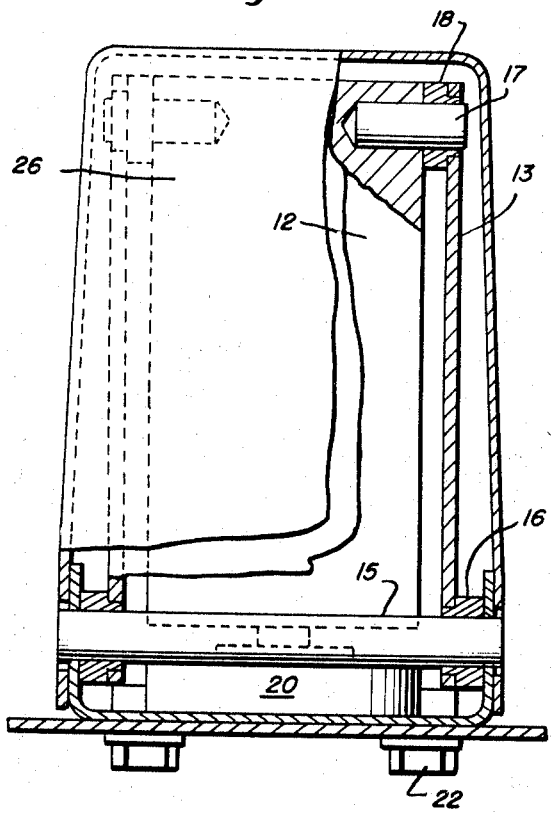
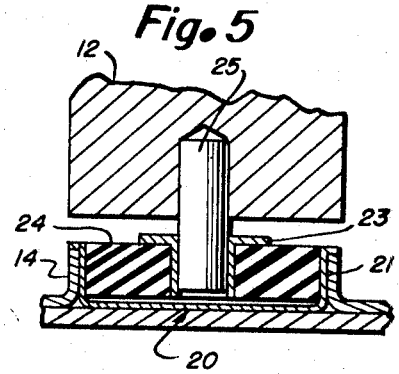
Gary E. Tolley
INVENTOR.
BY William M. Hobby
ATTORNEY

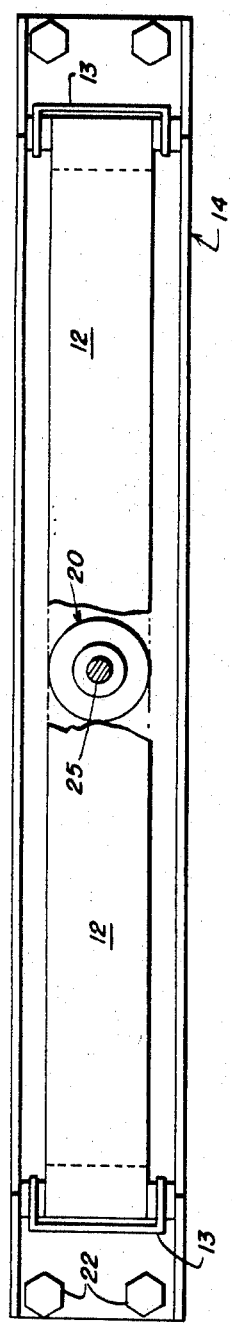
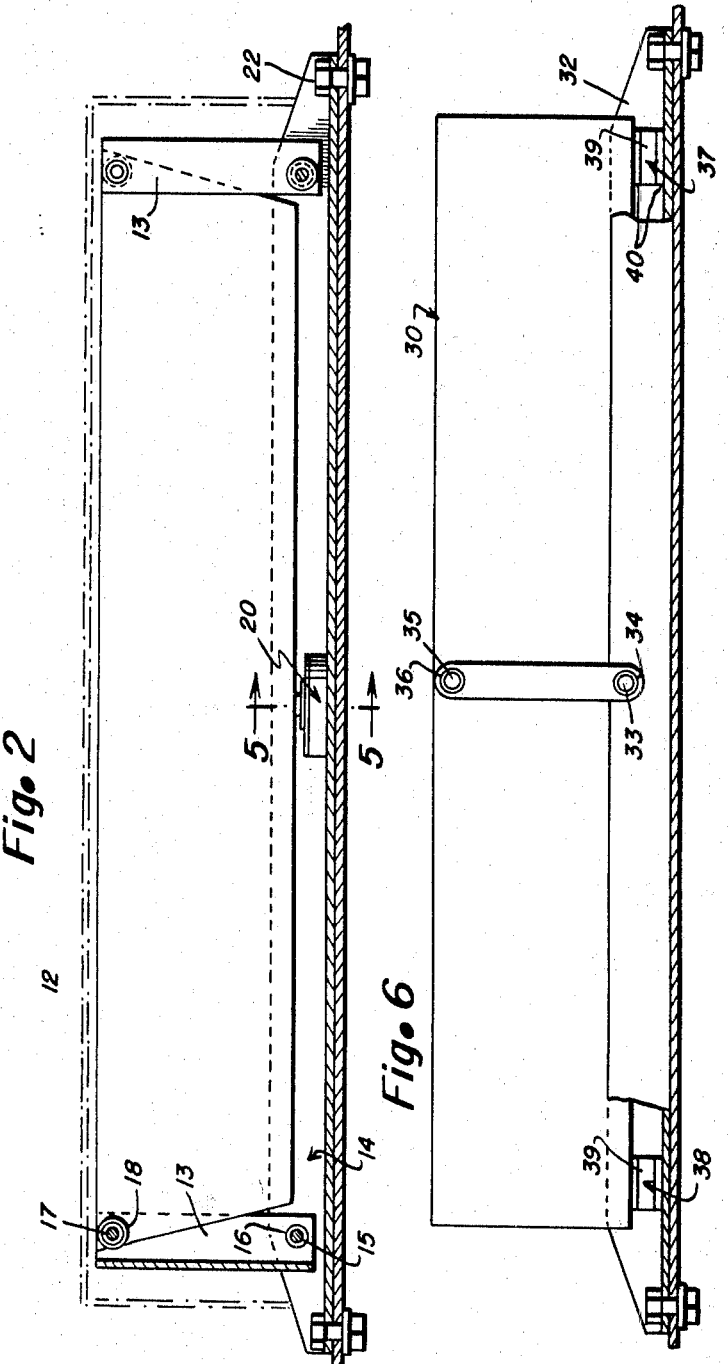
Gary E. Tolley
INVENTOR.

United States Patent Office 3,438,648
Patented Apr. 15, 1969

3,438,648
VEHICLE STABILIZER
Gary E. Tolley, Orlando, Fla., assignor, by mesne assignments, to Brown Auto Stabilizer Co., a corporation of Florida
Filed Oct. 16, 1967, Ser. No. 675,599
Int. Cl. B60r 27/00
U.S. Cl. 280—150                               7 Claims

ABSTRACT OF THE DISCLOSURE

A vehicle stabilizer apparatus for attachment to an automobile, or the like, to reduce vehicle skidding and vibrations. A mass of inertia is movably mounted to a base by hangers, or the like, for easy lateral movement, and at least one flexible load absorbing coupler couples the mass to the base for efficient transfer of a force produced by the mass resisting lateral movement of the base. The flexible load absorbing coupler allows only a small lateral movement of the mass before applying the load to the base and to a vehicle to which the base is attached.

BACKGROUND OF THE INVENTION

Field of the invention

The present invention relates to a vehicle stabilizer for reducing vehicle skidding and vibrations.

Automobiles, and the like, will skid when the centrifugal force produced when an automobile turns a curve overcomes the resistance due to tire friction. The friction resisting skidding, however, varies in accordance with the coefficient of friction of the tire treads and the road surface. This coefficient of friction varies with different road surfaces as well as with lubricants placed on the road, such as water, ice, snow or the like. It is also known that an automobile moving in any direction has the total friction between the wheels and the road surface reduced by vibrations which for extremely short periods of time leave the tire either without road contact or with a reduced vertical load being applied to the vibrating wheels. These vibrations tend to increase skidding on turns, and when the automobile is moving forward, these vibrations reduce the friction between the wheels and the road surface effecting riding comfort and tire wear. The present stabilizer acts to reduce or prevent skidding and to reduce vibration in the automobile by a novel combination which is quick reacting yet simple and inexpensive to manufacture and of sturdy construction.

Description of the prior art

The prior art teaches automobile stabilizers using a mass which is mounted for lateral movement so that when an automobile starts to skid, the mass will tend to remain stationary and resist the transverse movements of the rear wheels.

These prior art stabilizers usually consist of a cylindrical mass in a hollow cylinder with springs on either side of the mass for centering the mass and transferring the force produced by the mass to the hollow cylinder and thence to the automobile. Several prior patents have dealt with means for making the mass react more rapidly and for preventing the mass from sticking in the hollow cylinder.

One such system provides the mass with guiding rollers, one roller being spring loaded to follow any inequalities or unevenness that may develop in the surface of the hollow cylinder. Another teaching has the mass sliding on a center rod, while yet another has indentations in the hollow cylinder for the mass to slide on. It has also been suggested to mount the mass in a lubricating fluid for the reduction of friction between the mass and the cylinder, with a hole passing through the mass to prevent solid compression on either side thereof. One disadvantage in these prior art stabilizers is that for a given amount of space the mass is reduced by the circular shape of its cross-section, thus requiring an overall larger unit. In addition, hollow cylinders tend to get uneven areas in their surfaces which hinders the operation of the moving mass.

It has been suggested to suspend a mass from pairs of pendulum arms and allow the mass to swing freely back and forth. While this has a stabilizing effect, it is inefficient in that the resulting force vector is considerably angled downward from horizontal thereby wasting force. Finally, it has been suggested to suspend a weight to a casing by means of upright pivoted lever arms supporting a weight at their upper ends. These lever arms are arranged with spring loaded fulcrum members positioned well below the pivotal connection of the lever arms with the weight. This system appears to be considerably more complex than other prior art stabilizers, but claims an improved result by compounding the weight by use of a pivoted lever and fulcrum. However, such a device gains nothing since the base end of the lever is receiving equal and opposite force. The effect of the lever is thus cancelled and the applied force is equal to the mass inertia.

BRIEF DESCRIPTION OF THE DRAWINGS

Other objects, features and advantages of this invention will be apparent from a study of the written description and the drawings in which:

FIGURE 1 is a fragmentary top plan view of the rear of automobile showing the placement of the present vehicle stabilizer;

FIGURE 2 is a side cutaway view taken along lines 2—2 of a preferred embodiment of the present invention with certain parts broken away;

FIGURE 3 shows an end view of the embodiment of FIGURE 2 with parts broken away;

FIGURE 4 shows a top plan view of the structure of the embodiment of FIGURE 2;

FIGURE 5 illustrates the cutaway view of the load transfer portion of the embodiment of FIGURE 2; and FIGURE 6 shows a second embodiment of the present invention.

DESCRIPTION OF THE PREFERRED EMBODIMENTS

FIGURE 1 shows an automobile 9 having wheels 11 and a stabilizer according to the present invention located at 10. While the stabilizer 10 may be located anywhere in the rear of the automobile 9, a point as near to the rear as practical is preferred.

Briefly, when the automobile 9 turns a curve, a centrifugal force is applied to the automobile which is resisted by the friction between the tires 11 and the road surface. When this friction is overcome, the automobile will slide laterally or skid. This lateral sliding movement will produce a counter force in the stabilizer 10 which will prevent further skidding. Also, the stabilizer 10 tends to dampen vibrations in the automobile 9 and consequently in the tires 11, helping maintain better frictional contact between the tires 11 and the road surface.

Referring to FIGURE 2, there is shown a preferred embodiment of the present stabilizer with the cover removed and with portions removed therefrom for a better detail of the operation thereof. A mass of inertia 12, which may be a heavy piece of material such as an approximately 50-pound piece of steel, iron, lead, or the like, is shown connected to suspension hangers 13 by pins 17 which are held in bearings 18. Pins 17 extend outward from both sides of and movably attached to identical hangers 13 located on both ends of the mass 12. I prefer that the bearings 18 be permanent sintered bronze bearing which are cheap and durable, but it should be understood that ball bearings, nylon bearings or any other type of composition may be used without departing from the scope of the invention. The hangers 13 are connected to a base 14 by a shaft 15 parallel to the axis of pins 17 and fitted with bearings 16 which are the same as bearings 18. Base 14 may be formed of sheet metal such as 14 gage steel and is provided with openings for ready attachment to an automobile such as by bolting it in the trunk with bolts and nuts 22.

Referring to FIGURES 2 and 5, a load absorbing coupler 20 consists of an outer member 21 which is formed as part of the base 14. An inner circular member 23 acts as a bearing and is held in place by a resilient disc 24 which may be made of an elastomer or of natural or synthetic rubber. A pin 25 is inserted in the inner member 23 and extends upward into mass 12. As can be readily seen, upon the mass 12 attempting to shift to either side on hangers 13, a load will be applied to pin 25, and consequently to the member 23 which will in turn move to the extent that the resilient disc is displaced by the applied force. This force is accordingly applied to the member 21, to the base 14 and to the automobile 9 to resist skidding as will be explained in more detail later.

Referring to FIGURE 3, an end view of the stabilizer of FIGURE 2 is shown with a portion of the cover 26 removed and with mass 12 connected to hangers 13 by pins 17. Hangers 13 are connected to base 14 by a shaft 15 and the load absorbing coupler 20 may also be seen connected between the base 14 and the mass 12.

FIGURE 4 illustrates the mass 12 connected to hangers 13 at one end thereof and to bore 14 at the other end. The tops of bolts 22 can be viewed as can the load absorbing coupler 20 and pins 25.

The stabilizer of FIGURES 2 and 4 may be fastened to the rear of a vehicle such as an automobile by bolting with bolts 22.

The automobile when making a turn has centrifugal force applied to the mass thereof and mass 12 becomes a part of this total automobile mass. When the automobile starts to skid, its rear end moves laterally. The mass 12 which is suspended on hangers 13 will tend to remain stationery with respect to this lateral movement. This tending to remain stationary with respect to the skidding automobile will apply a force to the coupler 20 and hence to the automobile and thus resist the lateral movement. Because of the short distance and the mass 12 moves, such as ¼ of an inch and because of the way the mass is suspended on hangers 13, the system will react unusually quickly providing resistance to very small movements produced by vibrating wheels, or the like.

Turning now to FIGURE 6, there is shown a second embodiment of the present invention in which one set of hangers and two load absorbing couplers are utilized. The mass 30 is connected to hangers 31 by a shaft 35 which passes through the mass 30 and connects on either side to hangers 31 and bearings 36. Hangers 31 are connected to base 32 by shaft 33 and bearings 34. A cutaway portion of the base shows load absorbing couplers 37 and 38 illustrated as commercially available sheer mounts in which a flexible material 39 is sandwiched between a pair of rigid panels 40 with one panel connected to the base 32 and the other to the mass 30.

From the foregoing description it will be clear that an automobile stabilizer and vibration damper has been provided for the improved riding comfort and safety of passengers.

While two variations of load absorbing couplers and mass hanger means have been illustrated, it should be understood that other variations may be used without departing from the spirit and scope of the invention.

For instance, applicant has successfully used a commercially available vibration mount as the load absorbing coupler and the hangers could be any quick reacting means of movably suspending the mass.

This invention is not to be construed as limited to the particular forms disclosed herein, since these are to be regarded as illustrative rather than restrictive.

I claim:

1. A vehicle stabilizer and vibration damper comprising:
    (a) an elongated mass of inertia having two ends;
    (b) a base adapted to be attached to a vehicle;
    (c) means movably suspending said mass to said base;
    (d) load transfer means having resilient means fixedly attached to said base, said resilient means having an opening with a member inserted therein, and said member also extending into said mass between said ends thereof; whereby said load transfer means is adapted to flexibly resist the movement of said mass and to transfer a load from said mass to said base.

2. The stabilizer according to claim 1 in which said means for suspending said mass to said base includes two arms, each said arm having one end thereof movably connected to said base with the other end of each said arm movably connected to said mass.

3. The stabilizer according to claim 1 in which said load transfer means includes a hollow bearing insert in the opening in said resilient means between said member and said resilient means.

4. A vehicle stabilizer comprising:
    (a) an elongated mass of inertia having two ends;
    (b) an elongated base having two ends and adapted to be attached to a vehicle;
    (c) a plurality of arms, each said arm having two ends with one end thereof movably attached to said base and the other end of each said arm movably attached to said mass whereby said mass is maintained substantially parallel to said base;
    (d) resilient pad means attached directly between said mass and said base between the respective ends thereof, said resilient means being independent of said arms, and said resilient means being adapted to transfer a load from said mass to said base.

5. A stabilizer according to claim 4 having two arms.

6. A stabilizer according to claim 4 in which said resilient means has a plurality of resilient members.

7. The stabilizer according to claim 4 in which said resilient means has only one resilient member, said resilient member being located substantially an equal distance between the ends of said mass.

References Cited

FOREIGN PATENTS

| | | |
|---|---|---|
| 1,092,489 | 10/1953 | France. |
| 1,031,776 | 3/1953 | France. |
| 1,069,859 | 2/1954 | France. |
| 927,778 | 6/1963 | Great Britain. |

LEO FRIAGLIA, *Primary Examiner.*

R. R. SONG, *Assistant Examiner.*

U.S. Cl. X.R.

293—69; 296—1